United States Patent
Kameni et al.

(10) Patent No.: US 11,393,252 B2
(45) Date of Patent: Jul. 19, 2022

(54) EMOTION SENSING ARTIFICIAL INTELLIGENCE

(71) Applicant: Accenture Global Solutions Limited, Dublin (IE)

(72) Inventors: Laetitia Kameni, Juan-les-pins (FR); Richard Vidal, Antibes (FR); Emmanuel Viale, Cagnes sur Mer (FR)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 155 days.

(21) Appl. No.: 16/864,196

(22) Filed: May 1, 2020

(65) Prior Publication Data
US 2020/0349337 A1    Nov. 5, 2020

Related U.S. Application Data

(60) Provisional application No. 62/841,372, filed on May 1, 2019.

(51) Int. Cl.
| | |
|---|---|
| G06K 9/00 | (2022.01) |
| G06V 40/18 | (2022.01) |
| G06F 3/14 | (2006.01) |
| G06F 3/01 | (2006.01) |

(52) U.S. Cl.
CPC .......... *G06V 40/193* (2022.01); *G06F 3/013* (2013.01); *G06F 3/14* (2013.01)

(58) Field of Classification Search
CPC .......... G06K 9/0061; G06F 3/013; G06F 3/14
USPC .......................................................... 382/117
See application file for complete search history.

(56) References Cited

U.S. PATENT DOCUMENTS

| | | | |
|---|---|---|---|
| 10,990,996 B1* | 4/2021 | Podgorny | G06Q 30/0218 |
| 2008/0065468 A1* | 3/2008 | Berg | G06Q 30/02 |
| | | | 705/7.32 |
| 2018/0314066 A1* | 11/2018 | Bell | G09G 5/10 |
| 2019/0354334 A1* | 11/2019 | Billinghurst | A61B 3/113 |

* cited by examiner

*Primary Examiner* — Gabriel I Garcia
(74) *Attorney, Agent, or Firm* — Jordan IP Law, LLC

(57) ABSTRACT

Systems, apparatuses, and methods are directed toward determining emotional states of a subject. For example, the systems, apparatuses, and methods determine one or more previous characteristics of a pupil of an eye based on image data from eye tracking sensors, determine one or more current characteristics of the pupil based on image data from the eye tracking sensors, where the one or more current characteristics include one or more of a current position of the pupil or a current size of the pupil, track movements, based on image data from the eye tracking sensors, in a position of the pupil and changes in a size of the pupil over a time period, automatically predict an emotional state based on a comparison between the one or more previous characteristics and the one or more current characteristics, the tracked movements and the tracked changes in the size and adjust a parameter of one or more hardware devices based on the predicted emotional state.

17 Claims, 4 Drawing Sheets

EMOTION SENSING ARTIFICIAL INTELLIGENCE

CROSS-REFERENCE TO RELATED APPLICATION

The present application claims the benefit of priority to U.S. Provisional Application 62/841,372 filed on May 1, 2019 which is incorporated by reference herein.

FIELD OF THE DISCLOSURE

This disclosure generally relates to methods, systems, apparatuses, and computer readable media for determining emotional states of subjects.

BACKGROUND

Obtaining a genuine reflection of the subject's emotions in real-time may be complex, disruptive and costly. For example, a subject's emotional range may be varied and dependent on a number of different factors including personal experiences. Thus, determining a genuine emotion may be difficult, prone to error and time consuming.

SUMMARY

Consistent with the disclosure, exemplary embodiments of systems, apparatuses, and methods thereof for generating enhanced auditory stimuli, are disclosed.

In an embodiment, at least one non-transitory computer readable medium comprises a set of instructions, which when executed by one or more processors of a device, cause the one or more processors to determine one or more previous characteristics of a pupil of an eye based on image data from eye tracking sensors, determine one or more current characteristics of the pupil based on image data from the eye tracking sensors, wherein the one or more current characteristics include one or more of a current position of the pupil or a current size of the pupil, track movements, based on image data from the eye tracking sensors, in a position of the pupil and changes in a size of the pupil over a time period, automatically predict an emotional state based on a comparison between the one or more previous characteristics and the one or more current characteristics, the tracked movements and the tracked changes in the size and adjust a parameter of one or more hardware devices based on the predicted emotional state.

In an embodiment, a computing system, comprises a memory, and a processor coupled to the memory, wherein the processor is configured to determine one or more previous characteristics of a pupil of an eye based on image data from eye tracking sensors, determine one or more current characteristics of the pupil based on image data from the eye tracking sensors, wherein the one or more current characteristics include one or more of a current position of the pupil or a current size of the pupil, track movements, based on image data from the eye tracking sensors, in a position of the pupil and changes in a size of the pupil over a time period, automatically predict an emotional state based on a comparison between the one or more previous characteristics and the one or more current characteristics, the tracked movements and the tracked changes in the size, and adjust a parameter of one or more hardware devices based on the predicted emotional state.

In an embodiment, a method comprises determining one or more previous characteristics of a pupil of an eye based on image data from eye tracking sensors, determining one or more current characteristics of the pupil based on image data from the eye tracking sensors, wherein the one or more current characteristics include one or more of a current position of the pupil or a current size of the pupil, tracking movements, based on image data from the eye tracking sensors, in a position of the pupil and changes in a size of the pupil over a time period, automatically predicting an emotional state based on a comparison between the one or more previous characteristics and the one or more current characteristics, the tracked movements and the tracked changes in the size and adjusting a parameter of one or more hardware devices based on the predicted emotional state.

In an embodiment, a non-transitory computer readable medium comprises a set of instructions, which when executed by one or more processors of a device, cause the one or more processors to determine one or more previous characteristics of a pupil of an eye, determine one or more current characteristics of the pupil, wherein the one or more current characteristics include one or more of a current position of the pupil and a current size of the pupil, and generate a set of parameters to predict an emotional state based on a comparison between the one or more previous characteristics and the one or more current characteristics.

It is to be understood that both the foregoing general description and the following detailed description are exemplary and explanatory only and are not restrictive of the invention, as claimed.

BRIEF DESCRIPTION OF THE DRAWINGS

The various embodiments will become apparent to one skilled in the art by reading the following specification and appended claims, and by referencing the following drawings, in which:

DESCRIPTION OF THE EMBODIMENTS

Figure 1:
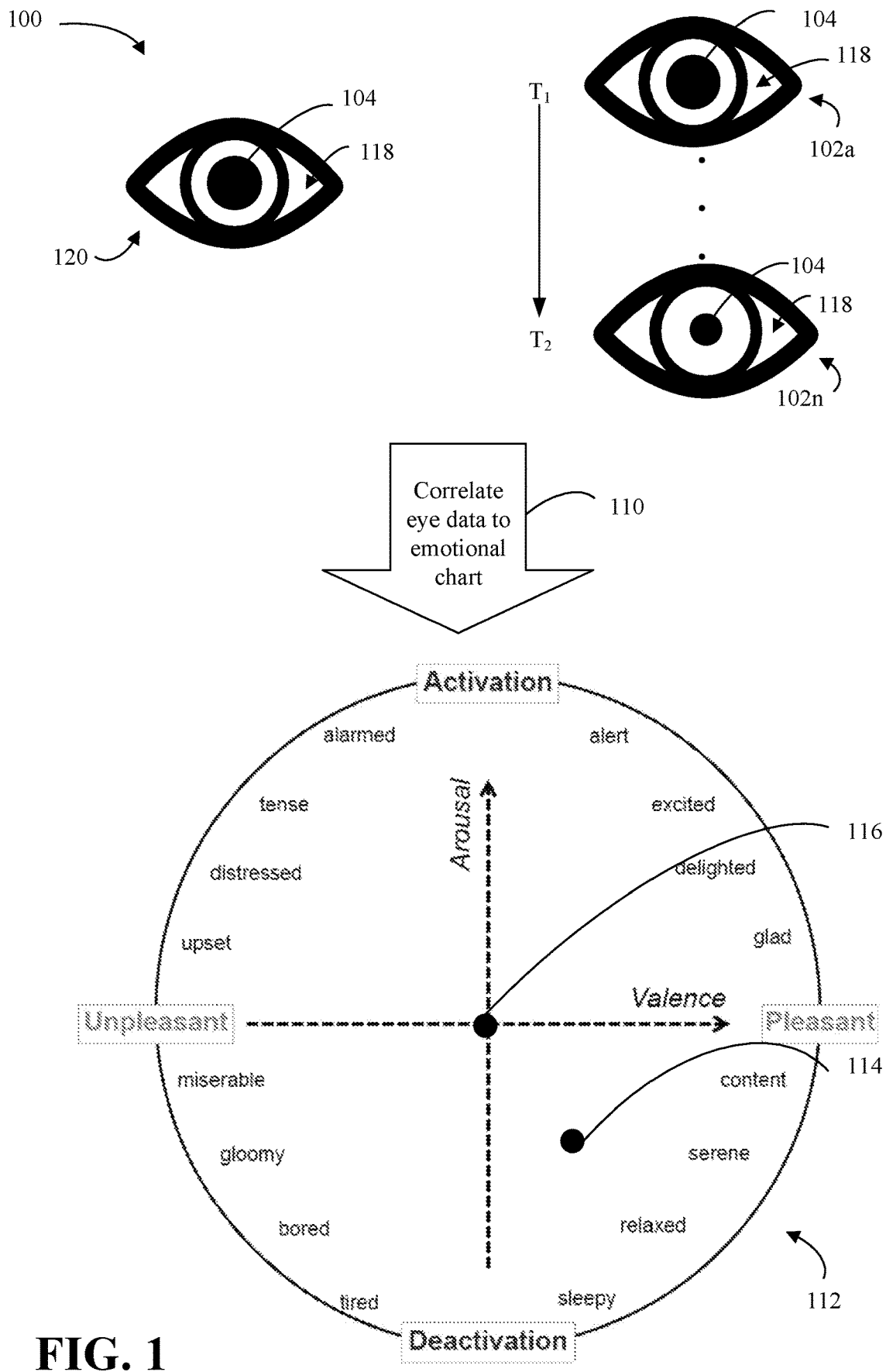
FIG. 1 shows a process to detect a subject's emotions in real-time during a virtual reality (VR) and/or augmented reality (AR) experience.

While the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Further, when a particular feature, structure, or characteristic is described in connection with an embodiment, it is submitted that it is within the knowledge of one skilled in the art to affect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a non-transitory machine readable (e.g., computer-readable) medium or machine-readable storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Some embodiments may include an enhanced emotion sensing apparatus. The enhanced emotion sensing apparatus may include artificial intelligence (e.g., an artificial intelligence model) to identify a subject's (e.g., a user of a device) emotions (e.g., emotional arousal and valence) during real-time experiences (e.g., virtual or augmented reality experiences). The enhanced emotion sensing apparatus may include sensors that receive physiological data. The physiological data may include pupil and/or eye information of the subject. The enhanced emotion sensing apparatus may analyze the pupil and/or eye information to determine the subject's emotions. In some embodiments, the enhanced emotion sensing apparatus may use the determined emotions to control real-world changes for the subject, such as adjusting a game that the subject is currently playing, modifying a display that the subject is viewing (e.g., content, color, brightness, volume, etc.), reporting the determined emotions to other parties and/or updating a library. Thus, some embodiments may control a parameter of a hardware device (e.g., display, transmission parameters, gaming console, etc.) based on the sensed emotion. Moreover, the sensed emotions may control the hardware device to provide a low latency response to user's emotions without manual inputs by the user. Thus, a user's experience may be enhanced by dynamic adjustments to increase user interest and based on emotional responses of the user. Moreover, computing resources may be re-allocated based on the user's sensed emotions. For example, if a computing device detects that the user is not bored or tired by a video and is lacking attention to the video, the computing device may reduce the fidelity of the video to reduce computing resources and reallocate resources to determining other videos which may be more interesting to the user. Thus, some embodiments may reduce computing resource allocations and/or increase computing resource allocations based on the sensed emotions. Furthermore, in some examples the enhanced emotion sensing apparatus may be applied for training purposes to better identify a trainee's emotional response (e.g., interested, bored, etc.) to a training program and adjust the training program based on the emotional response (e.g., take a break). Some examples may include an enhanced understanding of student emotion to provide insight on how to adapt a learning context, e-learning context, and/or content of lesson. Some examples may also be used to communicate a VR meeting attendee emotion to other participants so that the meeting may be adjusted based on the emotion. Moreover, some examples may also be used during marketing trials to provide customer insight (e.g., emotional response) related to a new product or advertisement in a genuine, authentic and unobtrusive manner.

Some embodiments may include training the enhanced emotion sensing apparatus so that the enhanced emotion sensing apparatus may accurately determine emotions. For example, some embodiments may include training an artificial intelligence program of the enhanced emotion sensing apparatus based on a training dataset. Some examples may generate a training dataset based on a trial where some number of subjects (e.g., 5 or more) have been provided an emotional stimulus (e.g., video clips from a collection of videos). For example, subjects may watch video clips within a VR headset while pupil data of the subjects is recorded. After each clip, the subject had to manually answer a questions related to his/her emotion. After the emotion sensing apparatus is trained, users may no longer provide manual inputs to ascertain the emotional state of the users during real-time experiences. The accuracy of the artificial intelligence program may improve as the artificial intelligence program converges towards correct solutions. The training dataset may be particular to a user and occur during a calibration process dedicated to the user, or include training data associated with a plurality of users so that the emotion sensing apparatus may identify emotions of a large group of people.

As noted above, the enhanced emotion sensing apparatus may utilize pupil and/or eye data to determine emotions of the subject. In contrast, other apparatuses may use other physiological factors in determining emotions and/or ask a subject for feedback (e.g., a self-assessment) regarding the subject's present emotional state.

Using other physiological factors in a VR architecture and/or an AR architecture may require supplementing the VR and/or AR architecture to add external devices (e.g., sensors) to sense the physiological factors. For example, an electroencephalogram device may use electrodes, which are attached to a subject's scalp, to measure electrical activity. The electrical activity may be analyzed to determine an emotional state of the subject. The addition of such sensors is intrusive and detracts from a subject's focus on an immersive VR and/or AR experience. Thus, such external devices may be invasive for the subject and impact the subject's perception of the environment. Therefore the addition of external devices may influence the emotion itself (e.g. a sensor could be uncomfortable and/or distracting to the subject).

As noted above, other apparatuses may use manual inputs (e.g., ask for subject feedback) to determine an emotional state of the subject during real-time experiences. Manual inputs are not real-time and may therefore be less accurate. For example, a subject may not accurately recall their emotional state after the VR and/or AR experience is concluded. Moreover, asking a subject for manual input during a VR and/or AR experience may "break" the VR and/or AR experience, be imprecise, be voluntarily faked by the subject (e.g., subject provides quick and inaccurate answer to continue with experience) and/or be influenced by external factors (e.g., a subject may be asked leading questions or provides answers to please an interviewer).

Thus, the enhanced emotion sensing apparatus may more accurately determine emotions in a non-invasive manner by tracking subject's emotions without requiring direct subject input and/or breaking the experience. Furthermore, the enhanced emotion sensing apparatus may reduce power consumption and a number of required devices by utilizing already existing sensors (e.g., eye tracking sensors) on the VR and/or AR architecture (e.g., the sensors are integrated into an AR or VR headset of the subject). It is to be noted however that the eye tracking sensors may be separate from the headset and/or contained within the headset.

While a VR and/or AR architecture is described herein, it will be understood that the embodiments herein may operate with other computing architectures such as a mixed reality architecture. Thus, embodiments as described herein may execute in conjunction with an extended reality architecture such as VR architectures, AR architectures and/or extended reality architectures.

The enhanced emotion sensing apparatus may execute all of the features described herein locally without interacting with a cloud-based architecture. For example, the emotion sensing apparatus may be a part of at a subject's device (e.g., mobile device of the subject and/or headset attached to the subject).

In some embodiments, the enhanced emotion sensing apparatus may operate in conjunction with a cloud-based architecture. For example, the enhanced emotion sensing apparatus may be in a cloud and receive one or more images of eyes of a subject through the internet. The enhanced emotion sensing apparatus may then analyze the images to determine emotions of the subject. In some embodiments, the enhanced emotion sensing apparatus may transmit the determined emotions to a device of the subject (e.g., a device that captured the image and/or transmitted the image to the enhanced emotion sensing apparatus), and/or other devices. The distinction between what is executed by a subject device and a cloud based enhanced emotion sensing apparatus may be flexible according to processing power of the subject device and operational requirements. For example, a subject device may determine eye data from an image (e.g., dilation of a pupil, distance between eye-lids, etc.) and provide the eye data to the cloud rather than an image. While an enhanced emotion sensing apparatus is described below and executes several operations, it will be understood that the enhanced emotion sensing apparatus may be part of a cloud-based architecture depending on system requirements.

FIG. 1 shows a process 100 to detect a subject's emotions in real-time during a VR and/or AR experience. An eye tracking sensor system embedded within a VR and/or AR architecture may capture, generate and/or receive baseline image 120 that includes eye 118. For example, in some embodiments, the baseline image 120 may be generated from and/or include one or more previously captured images of a subject during a calibration process. For example, measurements of characteristics of the one or more previously captured images may be averaged to generate average measurement characteristics, such as an average size of the eye 118 and/or average size of the pupil 104. The baseline image 120 may be generated to include the average measurement characteristics. The baseline image 120 may represent a neutral emotional state of the subject as explained below.

In some embodiments, the baseline image 120 may be an image that illustrates an eye 118 of the subject during a neutral emotional state of the subject. For example, the baseline image 120 may have been captured when the subject is stimulated by being presented with an emotionally unarousing image that does not trigger significant emotional responses. In some cases, the unarousing image that is presented to the subject may have been shown to the subject a few seconds before the baseline image 120 is captured. The emotional response of the subject to the unarousing image may however be exhibited at a later time due to delays in human processing. Thus, a pupil 104 of the eye 118 may be considered to be in a "neutral" state. In some embodiments a series of unarousing images are presented to the subject during the calibration process to generate the baseline image 120. When the subject is stimulated, one or more characteristics of the pupil 104 and/or eye 118 may be modified.

The eye tracking sensor system may capture evaluation images 102a-102n over a time period $T_1$-$T_2$ that are to be analyzed and evaluated for emotions. Evaluation image 102a may be a first image that is captured at time $T_1$ and evaluation image 102n may be an N-th image captured at time $T_2$. A series of other images of the eye 118 may be captured in-between times $T_1$-$T_2$. For example, process 100 may use eye tracking data based on captures at a regular frequency (example 100 Hz) for a period (e.g., anywhere from milliseconds to seconds) that is long enough for emotional analysis (e.g., enough time for 1,000 captures of images). Thus, some embodiments may utilize a plurality of captures of evaluation images 102a-102n during time period $T_1$-$T_2$ to conduct an analysis based on a continuous data of the pupil 104 and eye 118. As such, in some embodiments the enhanced emotion sensing apparatus may identify emotions based on a series and/or stream of evaluation images 102a-102n over a predetermined time period $T_1$-$T_2$. In some embodiments, the eye tracking sensor system may identify only one emotion from the stream of evaluation images 102a-102n.

While only one eye 118 (e.g., the left eye or right eye) is illustrated, it will be understood that embodiments described herein may use images of both eyes and/or pupils of the subject as differences between both eyes may further aid to detect an emotion. Thus, in some embodiments the left and right eyes of the subject may be compared against each other to determine an emotion.

Characteristics of the evaluation image 102a may be compared to the corresponding characteristics of the baseline image 120 to determine if the evaluation image 102a matches with the baseline image 120. For example, the size of the pupil 104 of the evaluation image 102a may be compared to the size of the pupil 104 of the baseline image 120. If the sizes are the same or similar, the process 100 may determine that a match exists. Based on the match, the process 100 may determine that the emotional state represented by evaluation image 102a is the same as the neutral emotional state represented by the baseline image 120. Each of the evaluation images 102a-102n may be compared to baseline image 120 to determine if a match exists and therefore identify if the emotional state represented by the respective image of the evaluation images 102a-102n is neutral.

The evaluation image 102n may illustrate the eye 118 of the subject when the subject is emotionally aroused. Artificial intelligence may compare characteristics of the evaluation images 102a-102n to each other (e.g., corresponding to previous and current characteristics) and/or characteristics of the baseline image 120 (e.g., corresponding to previous characteristics) to correlate the pupil 104 to an emotional state of the subject. For example, process 100 may include correlating the pupil 104 to an emotional chart 112 to predict the emotional state. Thus, process 100 may identify the emotional state of the subject over time period $T_1$-$T_2$, and/or more particularly at around time $T_2$ (an ending time of the time period $T_1$-$T_2$).

The emotional chart 112 may include two axes including an arousal axis and a valence axis. Valence may be a measure of the positive or negative nature of the recorded person's experience (unpleasant to pleasant). Arousal may be a measure of the intensity of an emotion (deactivation to activation). Process 100 may determine both the valence and the arousal from the evaluation images 102a-102n and/or baseline image 120.

In some embodiments, changes in the size and position of pupil 104 over time period $T_1$-$T_2$ may be used to determine an emotion and correlate the eye data to the emotional chart 110. In some embodiments, the changes and/or one or more of the evaluation images 102a-102n may be compared to the baseline image 120 to determine an emotional state. For example, a variation of a size of the pupil 104 of the evaluation image 102a to a size of the pupil 104 of the evaluation image 102n may indicate a change in emotional state of the subject (e.g., a shift from neutral emotional state to an aroused emotional state).

Further, a change in position of the pupil 104 may indicate an emotional state. For example, a change in the position of the pupil 104 over the time period $T_1$-$T_2$ may be determined by comparing the positions of the pupil 104 during the time period $T_1$-$T_2$. An emotional state may be identified based on a change in the positions (e.g., a distance between the positions) between different evaluation images 102a-102n of the pupils 104. In some embodiments, the position of the pupil 104 is the center points of the pupil 104.

In the present example, the size of the pupil 104 decreases over time period $T_1$-$T_2$. Moreover, the position of the pupil 104 remains the same over time period $T_1$-$T_2$. Thus, it may be calculated that the subject is less focused in evaluation image 102n as compared to evaluation image 102a (e.g., deactivated emotional state). Further since the position of the pupil 104 remains the same, it may be calculated that subject is not averting their gaze away from displayed images, implying that the subject is interested and engaged in a scene represented by the displayed images, as opposed to disinterested and/or bored. Thus, the process 100 may use an evolution of the size and/or position of the pupil 104 over time to determine an emotion. In some embodiments, an artificial intelligence model may identify patterns regarding how the pupil 104 will behave in accordance to subject's emotions. In some examples, the first evaluation image 102a and/or the previous baseline image 120 may correspond to one or more previous characteristics of the pupil 104 of the eye 118, while the one or more current characteristics of the pupil 104 corresponds to the evaluation image 102n. The previous and current characteristics may be compared to determine the emotional state.

Moreover, other characteristics of the eye 118 may be analyzed to determine the emotional state and correlate the eye data to the emotional chart 110. For example, if a tear drop was present in one or more of the evaluation images 102a-102n, then it may be calculated that the subject is experiencing a negative emotion such as sadness, distress and/or discomfort (e.g., image is too bright).

Furthermore, if the subject's eyelids evolve over time period $T_1$-$T_2$ to appear closer in evaluation image 102n as compared to evaluation image 102a, it may be calculated that the subject is squinting, bored or sleepy. For example, a maximum distance between the bottom most part of a center of the top eyelid and the top-most part of a center of the bottom eyelid in evaluation image 102n may be determined. Likewise, a similar maximum distance may be determined for all other images captured over time period $T_1$-$T_2$ including evaluation image 102a. The maximum distances may be compared to determine whether the maximum distances of the eyelids are steadily decreasing over time period $T_1$-$T_2$ (indicating boredom for example) or steadily increasing (indicating excitement for example). Such characteristics may be used in conjunction with the characteristics of the pupil 104 to determine emotional states. For example, if the maximum distance of evaluation image 102n is smaller than the maximum distance of evaluation image 102a, and the size of pupil 104 of evaluation image 102n is smaller than the size of the pupil 104 of evaluation image 102a, then it may be calculated that that the subject is sleepy or relaxed.

If the position of the pupil 104 changes over time period $T_1$-$T_2$, then a change in emotional state may be calculated. For example, if the position of the pupil 104 evolves over time period $T_1$-$T_2$ to be higher relative to the eye 118 or towards an upper eyelid, then it may be calculated that the subject is exhibiting an "eye-roll" to express disgust. Moreover, if the position of the pupil 104 evolves over time period $T_1$-$T_2$ to be farther to the left or the right relative to the eye 118 (e.g., the subject's gaze is unfocused on the AR and/or VR display), it may be calculated that the subject is no longer fully focused on the AR and/or VR experience and is bored.

In some embodiments, the process 100 may determine an average pupil 104 size and/or position. For example, the sizes and positions of the pupil 104 may be extrapolated from the evaluation images 102a-102n and averaged to determine the average size and/or position of the pupil 104. The process 100 may use the average size and/or position in conjunction with the measurements of the pupil 104 to detect emotional states. For example, the pupil 104 may be compared to the average pupil size and/or position.

In some embodiments, the process 100 may determine a peak pupil size of the pupil 104 of the subject. For example, the subject may be shown in an intensely stimulating image to provoke a maximum increase in size of the pupil 104, and then the size is recorded as a peak pupil size. In some embodiments, a series of intensely stimulating images are shown to the subject and averaged to determine the peak pupil size. For example, a maximum pupil size is recorded during each stimulating image. The maximum pupil sizes may be averaged and the average is then recorded as the peak pupil size. The process 100 may compare the evolution of the size of the pupil 104 over time period $T_1$-$T_2$ to the peak pupil size to determine an emotional state, similar to as described above with respect to the baseline image 120 that represents the neutral emotional state.

In some embodiments, each of a plurality of emotions, such as those shown by emotional chart 112, may be intentionally provoked in the user during a calibration process to train an artificial intelligence module. For example, in supervised learning the artificial intelligence module may receive a label (e.g., an expected emotion) and characteristics of the eye 118. Characteristics of the eye 118, such as size and/or position of the pupil 104, may be recorded during the provocation of a particular emotion and recorded in association with the particular emotion. Characteristics of the evaluation images 102a-102n may be compared to characteristics of each of the emotions to determine whether a match exists between the evaluation images 102a-102n and one or more of the emotions. If so, the process 100 may determine that the evaluation images 102a-102n represent the one or more of the emotions. In some embodiments, the artificial intelligence module may be implemented in hardware, firmware, software.

In some embodiments, the process 100 may determine a change in the size of the pupil with respect to, and over time, from the successive evaluation images 102a-102n, by comparing sizes of the pupil 104 in the images. Thus, the process 100 may determine a pupil size change derivative that indicates how quickly the subject's pupil 104 is changing. For example, if the size of the pupil 104 is quickly increasing, then it may be calculated that the subject is particularly provoked in the successive evaluation images 102a-102n.

In some embodiments, the process 100 may determine when blinks occur from the evaluation images 102a-102n.

The process 100 may use the time between the detected blinks to determine the emotional state. For example, if the time is above a threshold, it may be calculated that the subject is stimulated. In contrast, if the time is below the threshold or at the threshold, it may be calculated that the subject is not particularly aroused. In some embodiments, the process 100 may determine a mean blink time and set the threshold at the mean blink time. In some embodiments, the process 100 may use a time since a last blink rather than a time between two detected blinks to determine the emotional state of the subject.

As illustrated, the subject's emotions may be calculated and correlated to an emotional chart 112. As illustrated, the emotional chart 112 includes an arousal axis and valence axis, with the intersection of the valence and arousal axes being a neutral (e.g., not aroused and no valence) position. Position 116 indicates the emotional state of the subject as neutral and is based on image 120. The position 116 is at a neutral state and is therefore fully centered on the chart 112. In contrast, position 114 indicates the emotional state of the subject at around time $T_2$ and is determined from evaluation images 102a-102n and/or based on a comparison of the evaluation images 102a-102n to image 120. The position 114 indicates that at time $T_2$, the subject is stimulated and is serene.

In some examples, valence may be defined on a [−1; 1] scale, and arousal may be defined on a [−1 ; 1] scale. In some embodiments, at least one of two modeling approaches may be implemented: 1) modeling a 2D emotional state VA=h (Pupil); or creating independents two models Valence=f (Pupil) and Arousal=g(Pupil), where "f, g and h" are different functions.

As noted, the evolution and/or changes of the eye 118 be analyzed to determine the emotional state and/or position 114. For example, it may be calculated that the evaluation image 102a closely matches the image 120, and is therefore likely represents neutral emotional state. Thus, it may be calculated that the evaluation image 102n does not represent from the neutral emotional state and is therefore an emotionally aroused state Some changes in the eye 118 may be caused by external stimuli (e.g., biological responses to external stimuli such as a rapid change in brightness of surroundings of the user and/or changes in position of a user caused by for example changes in head movement). Some embodiments may identify external stimuli and/or environmental factors and predict an emotional state based in part on the external stimuli and/or environmental factors. For example, the eye tracking sensor system may track a stream of evaluation images 102a-102n over a period of time to identify external stimuli (e.g., an environmental factor) and adjust the correlation to the emotional chart 112 based on the external stimuli. The eye tracking sensor system may identify changes in environmental factors throughout the stream of evaluation images 102a-102n, and adjust the predicted emotional response based on the environmental changes. For example, if the eye tracking sensor system determines that a room becomes dark during the stream of evaluation images 102a-102n, then the eye tracking sensor system may determine that changes to the pupil 104 are caused by the change in the environmental factor (e.g., the change in darkness) and/or adjust the emotional analysis accordingly. For example, the eye tracking sensor system may weigh changes to size of the pupil 104 less significantly when a change in an environmental factor is detected, and determine the emotional state of the user more significantly on a position of the pupil 104 (e.g., weights in an algorithm may be adjusted). In some embodiments, when a change in an environmental factor is detected, the eye tracking sensor system may automatically cease identifying emotion during the change since it may be difficult to accurately identify whether the changes in the eye 118 is caused by the environmental factor or another factor.

In some embodiments, the change in the size of the pupil 104 during time period $T_1$-$T_2$ may be used to identify an emotional state without any comparison to previous images such as baseline image 120. In such embodiments, the pupil size of the pupil 104 may be compared to expected pupil sizes of various emotional states to determine a closest match to an emotional state. In some embodiments, a subset of emotions may be detected based on a limited range of arousal and valence values.

Each of the process 100 and/or methods described herein may be implemented in hardware, in software, or in some combination thereof. For example, each of the method blocks described herein may be implemented in configurable logic such as, for example, programmable logic arrays (PLAs), field programmable gate arrays (FPGAs), complex programmable logic devices (CPLDs), or in fixed-functionality logic hardware using circuit technology such as, for example, application specific integrated circuit (ASIC), complementary metal oxide semiconductor (CMOS) or transistor-transistor logic (TTL) technology, or any combination thereof. Alternatively or additionally, these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the modules may be written in any combination of one or more operating system applicable/appropriate programming languages, including an object oriented programming language such as JAVA, SMALLTALK, Python, C++ or the like and conventional procedural programming languages, such as the "C" programming language or similar programming languages.

Figure 2:
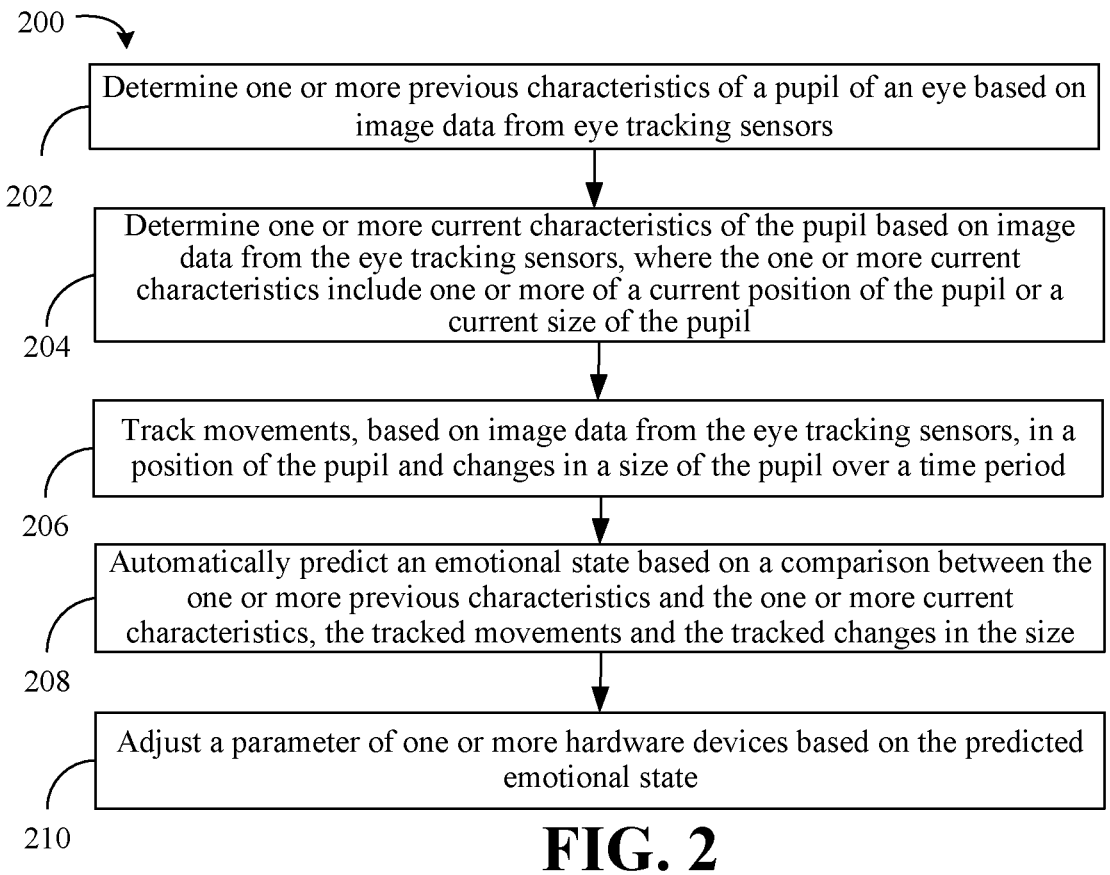
FIG. 2 illustrates a method of predicting an emotional state.

FIG. 2 illustrates a method 200 of predicting an emotional state. Method 200 may execute with time series analysis algorithms such as "Dynamic Time Warping." Illustrated processing block 202 may determine one or more previous characteristics of a pupil of an eye based on image data from eye tracking sensors. The one or more previous characteristics may include an average position and/or average size of the pupil. In some embodiments, the one or more previous characteristics may include previous positions and/or sizes of the pupil at a beginning of a time period rather than an average. In some examples, the previous positions and/or previous sizes may be determined based on a series of images and based on an analysis of the images with a time series analysis algorithm such as "Dynamic Time Warping." In some examples, the one or more previous characteristics are associated with an emotional state.

Illustrated processing block 204 may determine one or more current characteristics of the pupil based on image data from the eye tracking sensors, where the one or more current characteristics include one or more of a current position of the pupil or a current size of the pupil. In some examples, the current position of the pupil and the current size of the pupil may be captured during the time period. In some examples, the current positions and/or current sizes may be determined based on a series of images and based on an analysis of the images with a time series analysis algorithm such as "Dynamic Time Warping."

Illustrated processing block 206 tracks movements, based on image data from the eye tracking sensors, in a position of the pupil and changes in a size of the pupil over a time period. Illustrated processing block 208 automatically predicts an emotional state (e.g., the same emotional state associated with the one or more previous characteristics) based on a comparison between the one or more previous characteristics and the one or more current characteristics, the tracked movements and the tracked changes in the size. Illustrated processing block 210 adjusts a parameter of one or more hardware devices based on the predicted emotional state.

In some examples, the method 200 may further include identifying an environmental factor and predicting the emotional state based on the environmental factor. In some examples, the method 200 may further include correlating the current position of the pupil and the current size of the pupil to an emotional chart that includes a valence axis and an arousal axis. In some examples, the method 200 may further include in response to an identification of the predicted emotional state, modifying a display that is to present an image to a user associated with the eye. In some examples, the method 200 may further include calibrating an artificial intelligence model, and automatically predicting, with the artificial intelligence model, the emotional state based on the comparison, the tracked movements and the tracked changes in the size. In some examples, the method 200 may further include storing an image in association with the emotional state, presenting the image to a user, and determining the one or more previous characteristics as the image is presented to a user associated with the eye.

Figure 3:
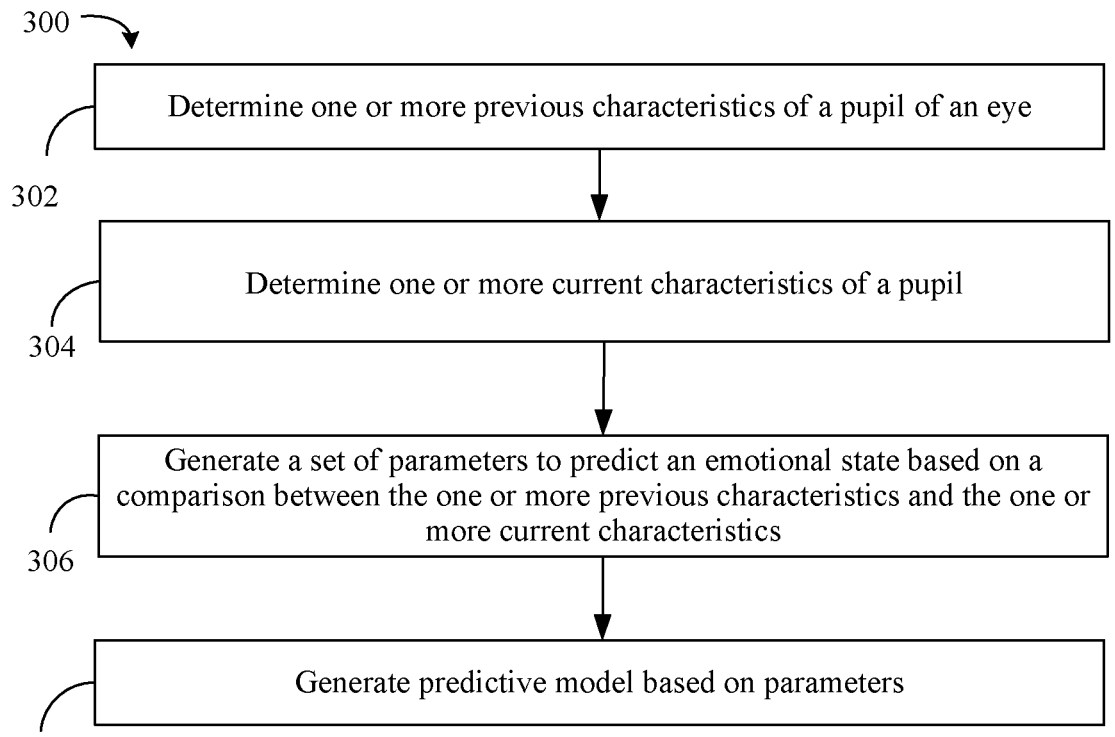
FIG. 3 illustrates a method of developing a model to determine emotional states.

FIG. 3 illustrates a method 300 of developing a model to determine emotional states. Method 300 may execute with various artificial intelligence architectures and layouts, such as vector quantization (e.g., K-means Clustering) and/or networks that execute with time series algorithms such as multi-scale convolutional neural networks. Some examples may combine multiple artificial intelligence architectures together. Further, as described below, positions and/or sizes may be determined based on a series of images and based on an analysis of the images with a time series analysis algorithm such as "Dynamic Time Warping."

Processing block 302 may determine one or more previous characteristics of a pupil of an eye of a subject. The one or more previous characteristics may include an average position and/or average size of the pupil. In some embodiments, the one or more previous characteristics may include previous positions and/or sizes of the pupil rather than an average. In some examples, the previous positions and/or previous sizes may be determined based on a series of images and based on an analysis of the images with a time series analysis algorithm such as "Dynamic Time Warping." Processing block 304 may determine one or more current characteristics of the pupil. The one or more current characteristics may include one or more of a current position of the pupil and a current size of the pupil. In some examples, the current positions and/or current sizes may be determined based on a series of images and based on an analysis of the images with a time series analysis algorithm such as "Dynamic Time Warping." Processing block 306 may generate a set of parameters to predict an emotional state based on a comparison between the one or more previous characteristics and the one or more current characteristics.

For example, processing block 306 may include training artificial intelligence to correctly identify emotional states. In some embodiments, processing block 306 may include the artificial intelligence determining a predictive emotional state based on the comparison. For example, the artificial intelligence may include a set of parameters to determine an emotional state (e.g., emotional arousal and valence) based on the one or more current characteristics and the one or more previous characteristics. The predictive emotional state may be compared to an actual emotional state (e.g., emotional arousal and valence) of the subject when the one or more current characteristics were captured. If the actual emotional state is the same as the predictive emotional state, the artificial intelligence may determine that the set of parameters needs no adjustment. If, however the predictive emotional state is not the same as the actual emotional state, then the artificial intelligence may determine that the set of parameters should be adjusted to correctly identify the actual emotional state based on the one or more current characteristics and the one or more previous characteristics.

In some embodiments, processing block 306 may include receiving an input from the user for the emotional state and storing the set of parameters in association with the emotional state (e.g., the parameters identify the emotional state). In some embodiments, the user is shown an image and/or provided a stimuli to provoke the emotional state (the stimuli is known to provoke the emotional state in people).

Processing block 308 may include generating a predictive model based on the parameters. For example, the predictive model may include the parameters. The model may be used to identify emotions as discussed above.

Method 300 may repeat until the artificial intelligence correctly identifies emotions. For example, method 300 may repeat until the artificial intelligence correctly identifies emotions at a predetermined threshold. For example, some embodiments of the method 300 may include testing the model against data sets to verify that the model is working well. In some embodiments, the parameters may be Hidden Markov Model parameters and the model may be a Hidden Markov Model. In some embodiments, the parameters may be a Convolutional Neural Network parameters and the model may be a Convolutional Neural Network. In some embodiments, the parameters may be a Recurrent Neural Network parameters and the model may be a Recurrent Neural Network.

In some embodiments, the method 300 may include identifying the actual emotional state based on physiological sensor inputs such as an electroencephalography sensor and/or galvanic skin resistance device apparatus. The method 300 may use the measurements of the electroencephalography device to determine an actual emotional valence when the one or more current characteristics of the pupil are captured. The method 300 may use the measurements of the galvanic skin resistance device to determine an actual emotional arousal when the one or more current characteristics of the pupil are captured. The actual emotional valence and actual emotional arousal may be compared to the predictive emotional state (e.g., a predicted emotional valence and predicted emotional arousal) to determine whether to modify the parameters as described above.

Figure 4:
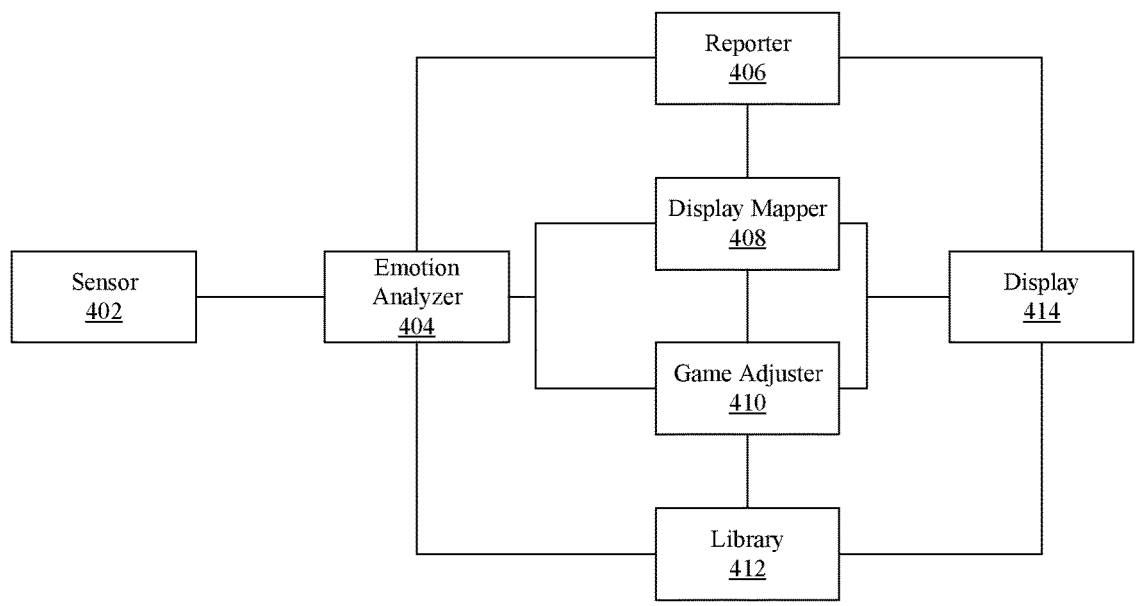
FIG. 4 illustrates an enhanced emotion sensing apparatus.

FIG. 4 illustrates an enhanced emotion sensing apparatus 400. The enhanced emotion sensing apparatus 400 may include a sensor 402 (e.g., camera or imaging device), to capture an image of a subject's eyes. The emotion analyzer 404 may determine an emotional state of the subject based on the image. For example, emotion analyzer 404 may extrapolate characteristics of the eyes and determine the emotional state based on the characteristics, and as described herein. The emotion analyzer 404 may provide the determined emotional state to a reporter 406, a display mapper 408, a game adjuster 410 and a library 412.

The emotion analyzer 404, reporter 406, display mapper 408, and game adjuster 410 may be implemented in only hardware, in only software, or in some combination thereof. For example, each of above-described elements may be implemented in configurable logic such as, for example, programmable logic arrays (PLAs), field programmable gate arrays (FPGAs), complex programmable logic devices (CPLDs), or in fixed-functionality logic hardware using circuit technology such as, for example, application specific integrated circuit (ASIC), complementary metal oxide semiconductor (CMOS) or transistor-transistor logic (TTL) technology, or any combination thereof Alternatively or additionally, these components may be implemented in one or more modules as a set of logic instructions stored in a machine- or computer-readable storage medium such as a random access memory (RAM), read only memory (ROM), programmable ROM (PROM), firmware, flash memory, etc., to be executed by a processor or computing device. For example, computer program code to carry out the operations of the modules may be written in any combination of one or more operating system applicable/appropriate programming languages, including an object oriented programming language such as JAVA, SMALLTALK, Python, C++ or the like and conventional procedural programming languages, such as the "C" programming language or similar programming languages.

The reporter 406 may report the determined emotional state to various parties. For example, the reporter 406 may report the determined emotional state to parties who are interested in the subject's response to specific content, such as advertisers or marketers. In some embodiments, the reporter 406 may report the determined emotional state to a presenter who is interested in whether the subject is interested in a presentation of the presenter. In some embodiments, the reporter 406 may report emotional responses to job training (e.g., are people paying attention during the presentation).

The display mapper 408 may modify a display of the subject based on the determined emotional state. For example, if the subject is bored, the display mapper 408 may attempt to adjust physical characteristics of display 414, such as by increasing a brightness or contrast, to increase emotional stimulation. In some embodiments, the display mapper 408 may execute not only display changes, but also other sensory modifications such as controlling speakers to output soothing sounds.

The game adjuster 410 may adjust a game flow of a game based on the determined emotional state. For example, if the subject is distressed, the game adjuster 410 may reduce sad content, or if the subject is bored the game adjuster 410 may increase the number of exciting scenes presented to the subject.

The library 412 may be, for example, a program or game that receives the determined emotional state. The library 412 may record the subject's emotions with respect to content for future reference. For example, the game adjuster 410 may reference the library 412 to identify what types of scenes and/or plotlines generate a particular emotion in the subject, and use those scenes and/or plotlines to generate the particular emotion when necessary.

It is to be noted that the reporter 406, the display mapper 408, the game adjuster 410 and the library 412 may all be interconnected together to receive outputs from each other. Furthermore, it is worth noting that the emotion analyzer 404 may be in a cloud while the sensor 402 and the display 414 may be on a subject device. The subject device may be connected to the emotion analyzer 404 through the internet. Likewise, the reporter 406, the display mapper 408, the game adjuster 410 and the library 412 may be in the cloud or the subject device depending on system requirements. If the reporter 406, the display mapper 408, the game adjuster 410 and the library 412 are in the cloud, the subject device may be connected to the reporter 406, the display mapper 408, the game adjuster 410 and the library 412 through the internet.

Figure 5:
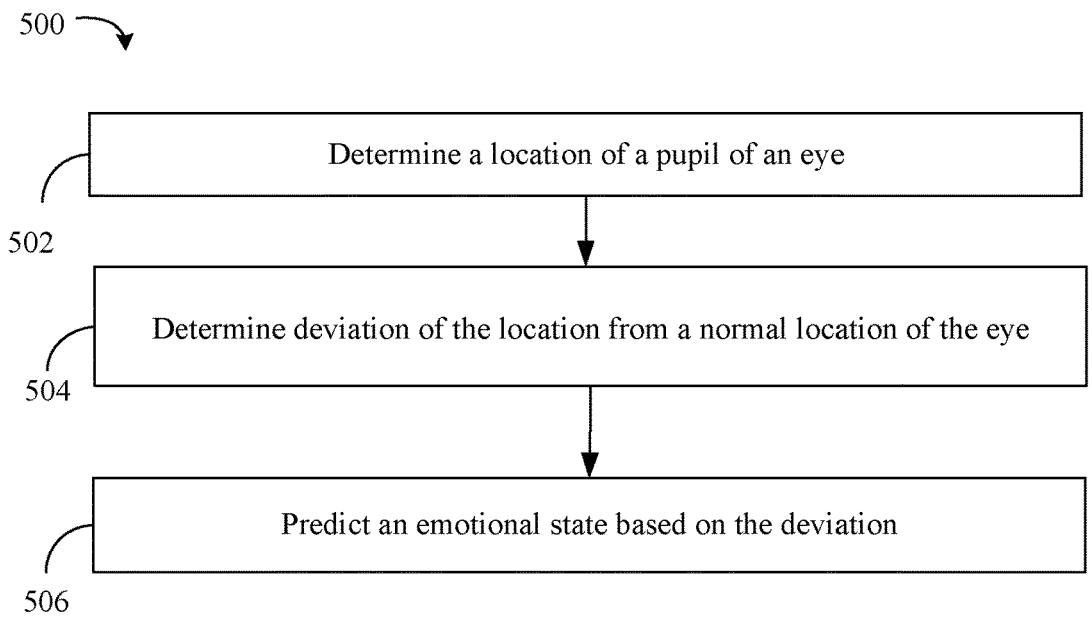
FIG. 5 illustrates a method to determine an emotional state from a position of a pupil of an eye.

FIG. 5 illustrates a method 500 to determine an emotional state from a position of a pupil of an eye. Processing block 502 may determine a location of a pupil relative to an eye. For example, the center of the eye may serve as a center of a Cartesian graph, with first coordinates of the pupil being calculated with respect to the Cartesian graph. Processing block 504 may determine a deviation of the location from a normal location (e.g., a neutral emotional state position of the eye) of the eye. For example, the normal location of the eye may have second coordinates on the Cartesian graph. The method 500 may calculate the distance between the first and second coordinates and set the distance as the deviation. Processing block 506 may predict an emotional state based on the deviation, and as described herein.

Figure 6:
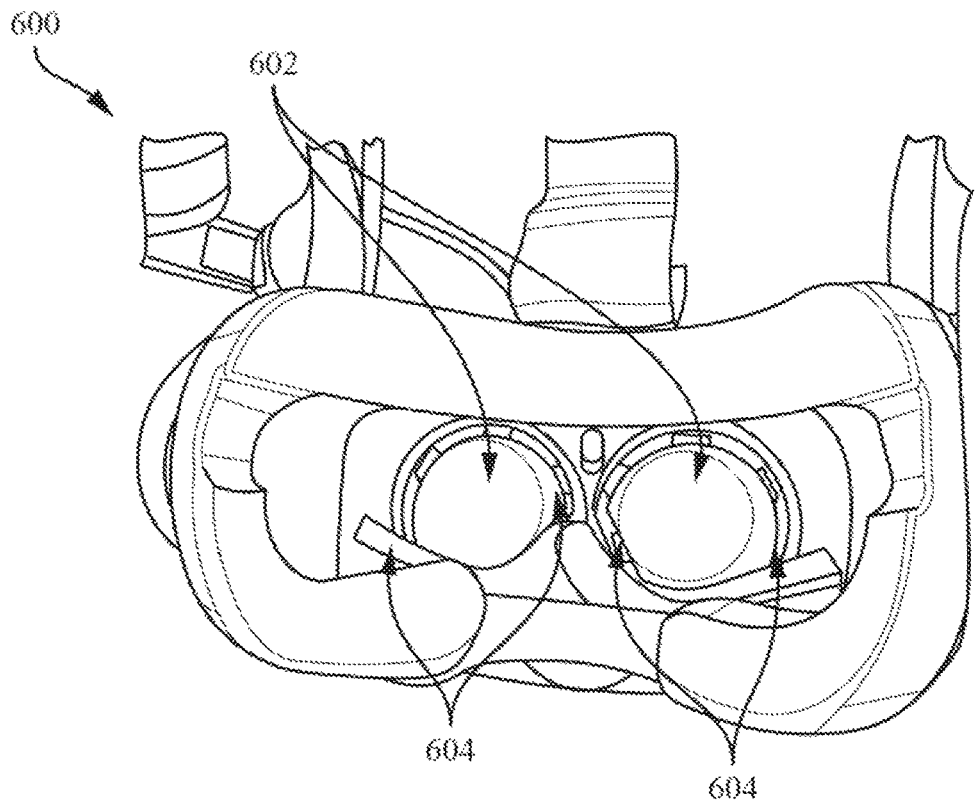
FIG. 6 illustrates an AR and/or VR headset form factor.

FIG. 6 illustrates an AR and/or VR headset 600 that is a head wearable form factor (e.g., a head mounted display). The subject may wear the head wearable form factor. The AR and/or VR headset 600 includes two lenses and/or screens 602 that are to present an image to the subject. The AR and/or VR headset 600 includes a series of eye sensors 604 to detect an eye and/or pupil of the subject. The AR and/or VR headset 600 may implement one or more aspects of the enhanced emotion sensing apparatus described herein.

The embodiments described herein may operate in conjunction with various sensory data in addition to the sensory data already described. For example, subject emotions may be reflected by a physiological reaction such as a variation of:

Skin Conductance
Brain Activity
Muscles Contraction
Heart Rate/Pressure
Facial Expressions
Pupil Dilation
Eye Blinking Frequency
Skin Temperature
Respiration Pattern Thus, some embodiments may utilize a variety of sensory data to evaluate a subject emotion (arousal and/or valence) based on one or more devices sensing these physiological reactions. In some embodiments, only eye data (e.g., pupil dilatation and/or position) data is used.

While VR and AR architectures were described above, it will be understood that the enhanced emotion sensing apparatus may be implemented in a variety of contexts (e.g., computing device having a camera, mobile devices, etc.). Thus, the enhanced emotion sensing apparatus may have a flexible implementation.

The flowchart and block diagrams in the Figures illustrate the architecture, functionality, and operation of possible implementations of systems, methods and computer program products according to various exemplary embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The methods shown herein may generally be implemented in a computing device or system. The computing device or system may be a subject level device or system or a server-level device or system. More particularly, the methods may be implemented in one or more modules as a set of logic instructions stored in a machine or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the methods and processes of any of the figures herein may be written in any combination of one or more programming languages, including an object-oriented programming language such as JAVA, SMALLTALK, Python, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, and/or other structural components that are native to hardware (e.g., host processor, central processing unit/CPU, microcontroller, etc.).

Example sizes/models/values/ranges may have been given, although embodiments are not limited to the same. Where specific details are set forth in order to describe example embodiments, it should be apparent to one skilled in the art that embodiments can be practiced without, or with variation of, these specific details. The description is thus to be regarded as illustrative instead of limiting.

Those skilled in the art will appreciate from the foregoing description that the broad techniques of the one or more embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. At least one non-transitory computer readable medium comprising a set of instructions, which when executed by one or more processors of a device, cause the one or more processors to:
   determine one or more previous characteristics of a pupil of an eye based on image data from eye tracking sensors;
   determine one or more current characteristics of the pupil based on image data from the eye tracking sensors, wherein the one or more current characteristics include one or more of a current position of the pupil or a current size of the pupil;
   track movements, based on image data from the eye tracking sensors, in a position of the pupil and changes in a size of the pupil over a time period;
   automatically predict an emotional state based on a comparison between the one or more previous characteristics and the one or more current characteristics, the tracked movements and the tracked changes in the size;
   adjust a parameter of one or more hardware devices based on the predicted emotional state; and
   correlate the current position of the pupil and the current size of the pupil to an emotional chart that includes a valence axis and an arousal axis.

2. The at least one non-transitory computer readable medium of claim 1, wherein:
   the one or more previous characteristics are associated with the emotional state, and
   the one or more previous characteristics include one or more of a previous position of the pupil or a previous size of the pupil.

3. The at least one non-transitory computer readable medium of claim 1, wherein the set of instructions, which when executed by the one or more processors, cause the one or more processors to:
   identify an environmental factor; and
   predict the emotional state based on the environmental factor.

4. The at least one non-transitory computer readable medium of claim 1, wherein the adjustment of the parameter of the one or more hardware devices includes a modification to a display.

5. The at least one non-transitory computer readable medium of claim 1, wherein the set of instructions, which when executed by the one or more processors, cause the one or more processors to:
   calibrate an artificial intelligence model; and
   automatically predict, with the artificial intelligence model, the emotional state based on the comparison, the tracked movements and the tracked changes in the size.

6. The at least one non-transitory computer readable medium of claim 1, wherein the set of instructions, which when executed by the one or more processors, cause the one or more processors to:
   store an image in association with the emotional state;
   present the image to a user; and
   determine the one or more previous characteristics as the image is presented to a user associated with the eye.

7. A computing system, comprising:
   a memory; and
   a processor coupled to the memory, wherein the processor is configured to:
      determine one or more previous characteristics of a pupil of an eye based on image data from eye tracking sensors;
      determine one or more current characteristics of the pupil based on image data from the eye tracking sensors, wherein the one or more current characteristics include one or more of a current position of the pupil or a current size of the pupil;
      track movements, based on image data from the eye tracking sensors, in a position of the pupil and changes in a size of the pupil over a time period;
      automatically predict an emotional state based on a comparison between the one or more previous characteristics and the one or more current characteristics, the tracked movements and the tracked changes in the size;

adjust a parameter of one or more hardware devices based on the predicted emotional state; and correlate the current position of the pupil and the current size of the pupil to an emotional chart that includes a valence axis and an arousal axis.

8. The system of claim 7, wherein:

the one or more previous characteristics are associated with the emotional state, and the one or more previous characteristics include one or more of a previous position of the pupil or a previous size of the pupil.

9. The system of claim 7, wherein the processor is to:

identify an environmental factor; and predict the emotional state based on the environmental factor.

10. The system of claim 7, wherein the adjustment of the parameter of the one or more hardware devices includes a modification to a display.

11. The system of claim 7, wherein the processor is to:

calibrate an artificial intelligence model; and automatically predict, with the artificial intelligence model, the emotional state based on the comparison, the tracked movements and the tracked changes in the size.

12. The system of claim 7, wherein the processor is to:

store an image in association with the emotional state;

present the image to a user; and determine the one or more previous characteristics as the image is presented to a user associated with the eye.

13. A method comprising:

determining one or more previous characteristics of a pupil of an eye based on image data from eye tracking sensors;

determining one or more current characteristics of the pupil based on image data from the eye tracking sensors, wherein the one or more current characteristics include one or more of a current position of the pupil or a current size of the pupil;

tracking movements, based on image data from the eye tracking sensors, in a position of the pupil and changes in a size of the pupil over a time period;

automatically predicting an emotional state based on a comparison between the one or more previous characteristics and the one or more current characteristics, the tracked movements and the tracked changes in the size;

adjusting a parameter of one or more hardware devices based on the predicted emotional state; and correlating the current position of the pupil and the current size of the pupil to an emotional chart that includes a valence axis and an arousal axis.

14. The method of claim 13, wherein:

the one or more previous characteristics are associated with the emotional state, and the one or more previous characteristics include one or more of a previous position of the pupil or a previous size of the pupil.

15. The method of claim 13, further comprising:

identifying an environmental factor; and predicting the emotional state based on the environmental factor.

16. The method of claim 13, wherein the adjusting of the parameter of the one or more hardware devices includes modifying the display.

17. The method of claim 13, further comprising:

calibrating an artificial intelligence model; and automatically predicting, with the artificial intelligence model, the emotional state based on the comparison, the tracked movements and the tracked changes in the size.

* * * * *